US010694689B2

(12) United States Patent
Klein et al.

(10) Patent No.: US 10,694,689 B2
(45) Date of Patent: Jun. 30, 2020

(54) MULTI-PIECE HYDROPONIC TOWER

(71) Applicant: MJNN, LLC, South San Francisco, CA (US)

(72) Inventors: Brice Klein, San Francisco, CA (US); Michael Flynn, Palo Alto, CA (US); Alexandre Le Roux, Menlo Park, CA (US); Meaghan Fitzgerald, San Francisco, CA (US); Matthew Matera, San Francisco, CA (US); Mark Cuson, Los Altos, CA (US); Alex Ibrahim, Pacifica, CA (US)

(73) Assignee: MJNN, LLC, South San Francisco, CA (US)

( * ) Notice: Subject to any disclaimer, the term of this patent is extended or adjusted under 35 U.S.C. 154(b) by 273 days.

(21) Appl. No.: 15/910,601

(22) Filed: Mar. 2, 2018

(65) Prior Publication Data

US 2019/0269082 A1    Sep. 5, 2019

(51) Int. Cl.
*A01G 31/06* (2006.01)
*A01G 9/04* (2006.01)

(52) U.S. Cl.
CPC .............. *A01G 31/06* (2013.01); *A01G 9/047* (2013.01)

(58) Field of Classification Search
CPC ......... A01G 9/047; A01G 31/04; A01G 31/06
See application file for complete search history.

(56) References Cited

U.S. PATENT DOCUMENTS

| | | | | |
|---|---|---|---|---|
| 3,896,587 A * | 7/1975 | Insalaco | ................. | A01G 9/021 47/65.5 |
| 4,033,072 A * | 7/1977 | Kobayashi | ............ | A01G 31/06 47/62 R |
| 5,251,399 A * | 10/1993 | Rasmussen | ............ | A01G 9/023 211/88.03 |
| 5,363,594 A * | 11/1994 | Davis | ..................... | A01G 9/022 47/82 |
| 5,555,676 A * | 9/1996 | Lund | ..................... | A01G 9/022 47/82 |
| 5,913,477 A * | 6/1999 | Dean | ........................ | A01G 9/12 239/289 |
| 5,918,416 A * | 7/1999 | Ammann, Jr. | ......... | A01G 31/02 47/58.1 R |
| 6,477,805 B2 * | 11/2002 | Ware | ..................... | A01G 31/02 47/83 |

(Continued)

FOREIGN PATENT DOCUMENTS

CN    204616518 U    9/2015
WO    WO 2017/109279 A1    6/2017

*Primary Examiner* — Magdalena Topolski
*Assistant Examiner* — Morgan T Barlow
(74) *Attorney, Agent, or Firm* — Patent Law Office of David G. Beck

(57) ABSTRACT

A dual-sided hydroponic tower utilizing separate body and face components coupled together with temporary fasteners. The tower includes a tower body that defines two vertical cavities. Attached to each vertical cavity is a tower face, each tower face including a plurality of plant container compatible cut-outs. By utilizing separate body and face components, the end user is able to easily switch tower face plates in order to adapt the tower to different plant container configurations. The multi-piece tower design also simplifies tower construction as well as tower maintenance between planting cycles.

8 Claims, 9 Drawing Sheets

(56) References Cited

U.S. PATENT DOCUMENTS

| | | | |
|---|---|---|---|
| 7,143,544 B2* | 12/2006 | Roy | A01G 31/02 47/60 |
| 7,171,782 B2* | 2/2007 | Felknor | A01G 9/0291 47/73 |
| 8,365,466 B1* | 2/2013 | Storey | A01G 31/06 47/62 C |
| 8,418,403 B1 | 4/2013 | Nuttman | |
| 9,814,186 B2* | 11/2017 | Anderson | A01G 31/06 |
| 10,123,494 B2* | 11/2018 | Janssen | A01G 9/025 |
| 2003/0089037 A1* | 5/2003 | Ware | A01G 31/02 47/83 |
| 2006/0156624 A1* | 7/2006 | Roy | A01G 31/02 47/62 R |
| 2008/0078118 A1* | 4/2008 | Bissonnette | A01G 9/02 47/63 |
| 2011/0107667 A1* | 5/2011 | Laurence | A01G 9/025 47/59 S |
| 2014/0130414 A1* | 5/2014 | Storey | A01G 31/06 47/62 A |
| 2014/0290137 A1* | 10/2014 | Nagels | A01G 31/06 47/62 R |
| 2015/0313104 A1* | 11/2015 | Cottrell | A01G 22/00 47/62 A |
| 2016/0066525 A1* | 3/2016 | Duquesnay | A01G 9/025 47/62 R |
| 2016/0120141 A1* | 5/2016 | Stolzfus | A01G 31/06 47/62 A |
| 2017/0055473 A1* | 3/2017 | Baker | A01G 31/06 |
| 2017/0105372 A1* | 4/2017 | Bryan, III | A01G 31/02 |
| 2017/0202164 A1* | 7/2017 | Dufresne | A01G 31/06 |
| 2017/0238486 A1* | 8/2017 | De Feo | A01G 9/021 |
| 2017/0339841 A1* | 11/2017 | Monasterio | A01G 9/0293 |
| 2018/0000029 A1* | 1/2018 | Martin | A01G 31/06 |
| 2018/0007849 A1* | 1/2018 | Cohen | A01G 31/02 |
| 2018/0042186 A1* | 2/2018 | Kop | A01H 1/025 |
| 2018/0092314 A1* | 4/2018 | McGuinness | A01G 9/023 |
| 2018/0213734 A1* | 8/2018 | Smith | A01G 24/00 |
| 2018/0295800 A1* | 10/2018 | Kiernan | A01G 31/06 |
| 2018/0325052 A1* | 11/2018 | Gru | A01G 31/02 |
| 2019/0082617 A1* | 3/2019 | Moffitt | A01G 22/00 |
| 2019/0082627 A1* | 3/2019 | Moffitt | A01G 31/06 |
| 2019/0200551 A1* | 7/2019 | Walters | A01G 31/02 |
| 2019/0269079 A1* | 9/2019 | Klein | A01G 31/02 |
| 2019/0297787 A1* | 10/2019 | Klein | A01G 9/247 |

* cited by examiner

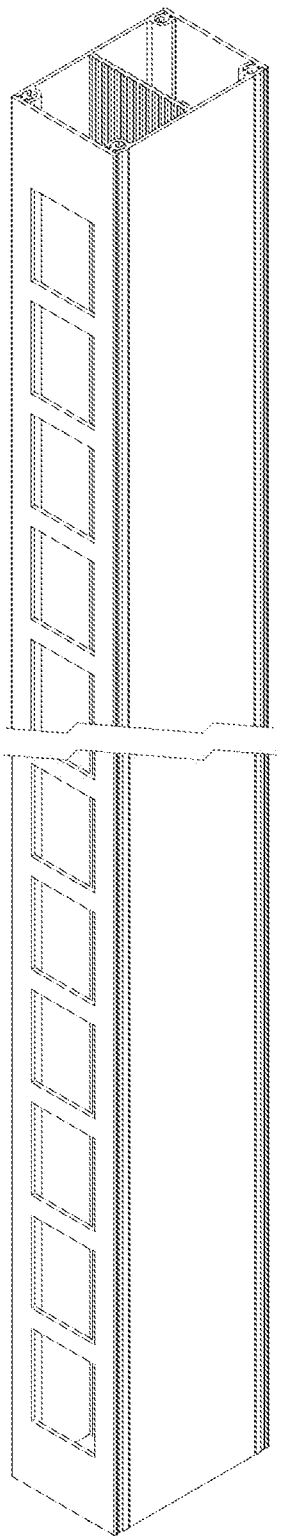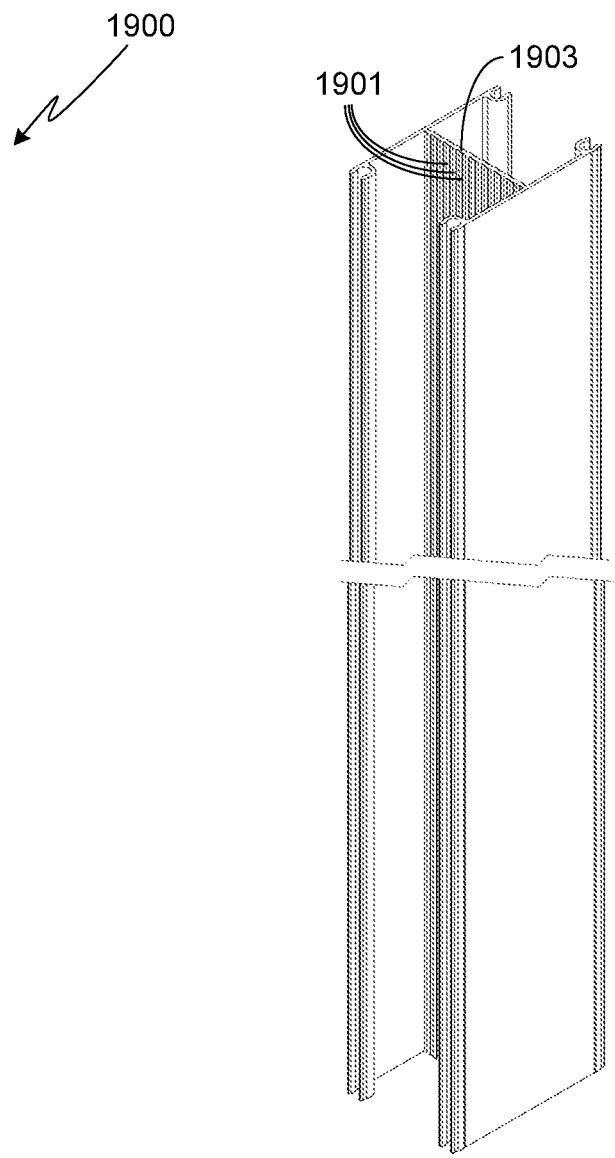
FIG. 19
FIG. 20

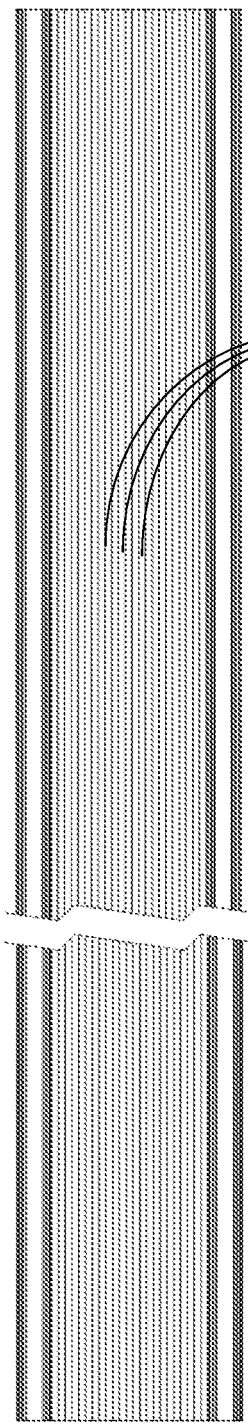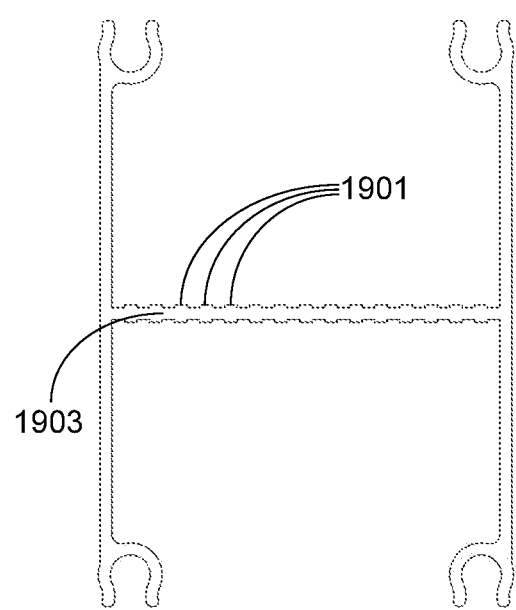
FIG. 21
FIG. 22

MULTI-PIECE HYDROPONIC TOWER

FIELD OF THE INVENTION

The present invention relates generally to hydroponic growing systems and, more particularly, to a hydroponic tower that provides increased planting consistency, decreased manufacturing time and cost, and improved tower characteristics (e.g., strength, ease of cleaning, efficiency of use, etc.).

BACKGROUND OF THE INVENTION

Given the continued growth of the world's population, and given that the regions allocated for agricultural pursuits have decreased or simply become less favorable to such activities, the ability of conventional farms to feed the world's growing population has become increasingly taxed. Additionally, since population centers and agricultural centers are frequently not co-located, and due to the time and expense associated with shipping agricultural goods, in many regions of the world only the wealthy are able to obtain adequate supplies of non-processed food, i.e., raw fruits and vegetables. Furthermore, the fruits and vegetables that do reach population centers are likely to be of decreased nutritional content and flavor, both due to the distance that they have traveled and the fact that much of today's produce is bred for durability and fertility rather than flavor & nutrition. As a result, there has been a renewed interest in soilless growing techniques that do not require the use of pesticides, drastically reduce the use of water, and allow for growing varietals that are bred for nutrition and flavor instead of durability.

Hydroponics is a soilless growing technique in which plants are grown using a liquid solution of water and nutrients. The roots of the plants are typically maintained in a fibrous or granular material, often comprised of plastic, and fed via a wick, drip, nutrient film, or other nutrient delivery system. Hydroponic growing systems are often established within indoor facilities, thus allowing them to be located in or near population centers. This approach also provides exceptional climate control (i.e., temperature, humidity, air flow, $CO_2$ concentration, light wavelength, intensity and duration, etc.) as well as improved pest and disease control, thus allowing an indoor hydroponic farm to succeed in a region in which the outside environment and/or the soil conditions are inhospitable to the use of conventional farming techniques. Furthermore, hydroponic and other soilless growing techniques can yield extremely high plant densities, especially in those instances in which either horizontal stacking systems or vertical growth towers are used.

While hydroponic farming techniques offer a number of advantages over conventional farming techniques, in order to achieve large-scale adoption of these techniques it is vital that the cost per plant be competitive with the costs associated with conventional farming techniques. Accordingly, the present invention provides a hydroponic tower that achieves increased planting consistency, increased tower strength, decreased manufacturing time and cost, and simplified maintenance between use cycles.

SUMMARY OF THE INVENTION

The present invention provides a multi-piece hydroponic tower comprised of (i) a tower body; (ii) a tower face, where the tower face includes a plurality of plant container cut-outs configured to accept a plurality of plant containers; and (iii) a plurality of fasteners, where the plurality of fasteners are configured to attach the tower face to the tower body to form a cavity, where the cavity is configured to provide a passageway for a water/nutrient mix. The fasteners may be comprised of permanent fasteners configured to permanently attach the tower face to the tower body; alternately, the fasteners may be comprised of temporary fasteners configured to temporarily attach the tower face to the tower body such that the tower face is detachable. The tower body and face, which may be white, may be fabricated from plastic (e.g., polyethylene, polypropylene, polyvinyl chloride, polytetrafluoroethylene, and acrylonitrile butadiene styrene, etc.).

The tower body may be a dual-sided tower body, where the multi-piece hydroponic tower is further comprised of (i) a second tower face, where the second tower face includes a second plurality of plant container cut-outs configured to accept a second plurality of plant containers; and (ii) a second plurality of fasteners, where the second plurality of fasteners are configured to attach the second tower face to the tower body to form a second cavity, where the second cavity is configured to provide a second passageway for a water/nutrient mix. The first and second pluralities of fasteners may be comprised of permanent fasteners configured to permanently attach both the tower face and the second tower face to the tower body; alternately, the first and second pluralities of fasteners may be comprised of temporary fasteners configured to temporarily attach the first and second tower faces to the tower body such that the first and second tower faces are detachable.

In a configuration in which the multi-piece hydroponic tower is a dual-sided hydroponic tower, the tower body may be further comprised of (i) a first tower body side wall corresponding to the first cavity, (ii) a second tower body side wall corresponding to the second cavity, (iii) a second tower face comprised of a second plurality of plant container cut-outs configured to accept a second plurality of plant containers, and (iv) a first portion of a cavity dividing center wall; and the tower face may be further comprised of (i) a third tower body side wall corresponding to the first cavity, (ii) a fourth tower body side wall corresponding to the second cavity, and (iii) a second portion of the cavity dividing center wall.

The tower face may be wider than the cavity within the tower body, resulting in (i) a first portion of the tower face extending beyond the first tower body side wall, (ii) a second portion of the tower face extending beyond the second tower body side wall, and (iii) a third portion of the tower face being centered relative to the tower body. The tower face may also include indexing marks (e.g., holes, indentations, dye marks, etc.).

The tower body of the multi-piece hydroponic tower may include: (i) one or more fins that extend from a rear tower body surface in a direction away from the tower cavity; (ii) tapered side walls; and (iii) ridges, either uniform or non-uniform, on the interior surface of the rear tower body wall.

A further understanding of the nature and advantages of the present invention may be realized by reference to the remaining portions of the specification and the drawings.

BRIEF DESCRIPTION OF THE DRAWINGS

It should be understood that the accompanying figures are only meant to illustrate, not limit, the scope of the invention and should not be considered to be to scale. Additionally, the same reference label on different figures should be understood to refer to the same component or a component of similar functionality.

FIG. 19 provides a perspective view of an exemplary dual-sided, multi-piece hydroponic tower that utilizes ridges on the back cavity walls to improve water/nutrient flow control;

FIG. 20 provides a perspective view of the dual-sided, multi-piece hydroponic tower shown in FIG. 19 with both the front face and the rear face removed;

FIG. 21 provides a front view of the body of the tower shown in FIGS. 19 and 20, this figure showing the back wall ridges; and FIG. 22 provides a cross-sectional view of the body of the tower shown in FIGS. 19 and 20.

DESCRIPTION OF THE SPECIFIC EMBODIMENTS

As used herein, the singular forms "a", "an" and "the" are intended to include the plural forms as well, unless the context clearly indicates otherwise. The terms "comprises", "comprising", "includes", and/or "including", as used herein, specify the presence of stated features, process steps, operations, elements, and/or components, but do not preclude the presence or addition of one or more other features, process steps, operations, elements, components, and/or groups thereof. As used herein, the term "and/or" and the symbol "/" are meant to include any and all combinations of one or more of the associated listed items. Additionally, while the terms first, second, etc. may be used herein to describe various steps, calculations, or components, these steps, calculations, or components should not be limited by these terms, rather these terms are only used to distinguish one step, calculation, or component from another. For example, a first calculation could be termed a second calculation, and, similarly, a first step could be termed a second step, and, similarly, a first component could be termed a second component, without departing from the scope of this disclosure.

Figure 1:
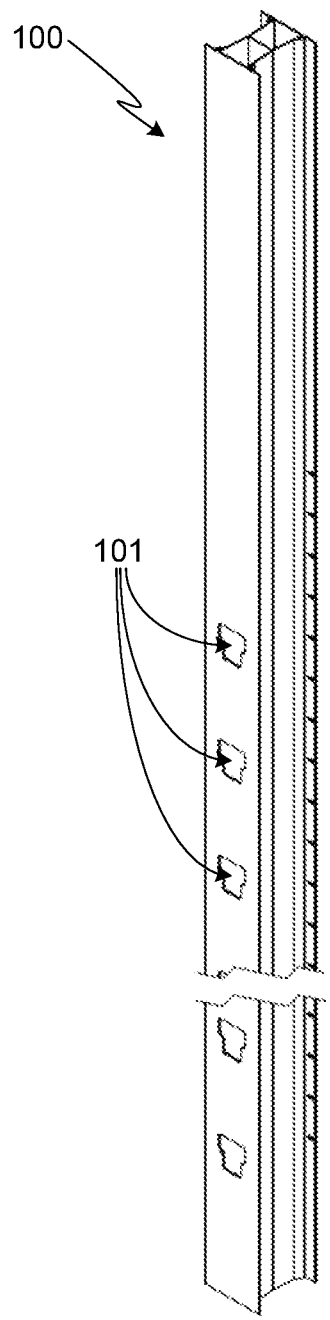
FIG. 1 provides a perspective view of an exemplary dual-sided, multi-piece hydroponic tower in accordance with the invention.
Figure 2:
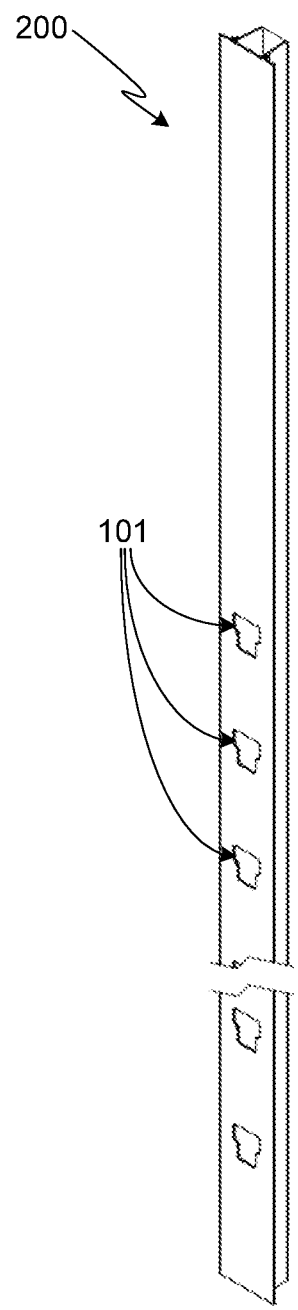
FIG. 2 provides a perspective view of an exemplary single-sided, multi-piece hydroponic tower in accordance with the invention.

FIG. 1 provides a perspective view of an exemplary dual-sided, multi-piece hydroponic tower 100. FIG. 2 provides a perspective view of a similar tower 200 that utilizes a single-sided, multi-piece design. In order to illustrate the tower design, towers 100 and 200 each include a plurality of cut-outs 101 for use with a compatible plant container such as the plant container disclosed in co-assigned and co-pending U.S. patent application Ser. No. 15/910,445, filed 2 Mar. 2018, the disclosure of which is incorporated herein for any and all purposes. It should be understood, however, that the multi-piece tower design disclosed in the present application is not limited to use with this particular plant container, rather the multi-piece hydroponic tower designs disclosed herein may be used with any suitably sized hydroponic plant container. As such, cut-outs 101 are only meant to illustrate, not limit, the present tower design and it should be understood that the present invention is equally applicable to other cut-out designs.

Figure 3:
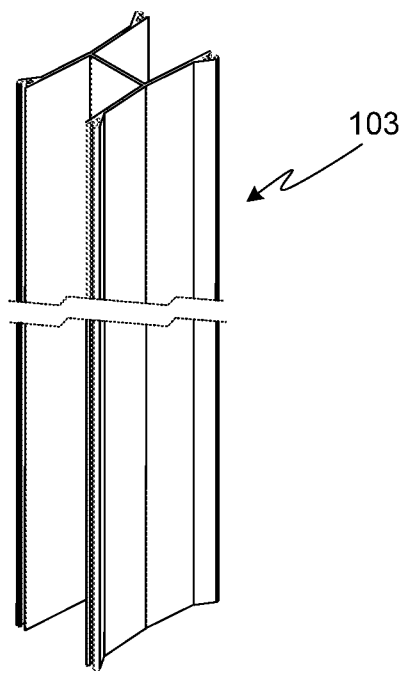
FIG. 3 provides a perspective view of the dual cavity tower body utilized in the tower shown in FIG. 1.
Figure 4:
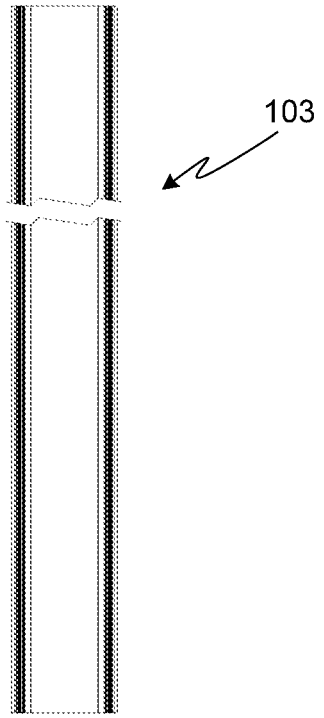
FIG. 4 provides a front view of the dual cavity tower body utilized in the tower shown in FIG. 1.
Figure 5:
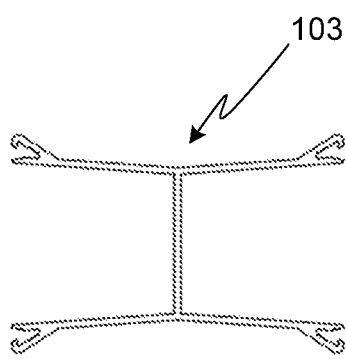
FIG. 5 provides a cross-sectional view of the dual cavity tower body utilized in the tower shown in FIG. 1.
Figure 6:
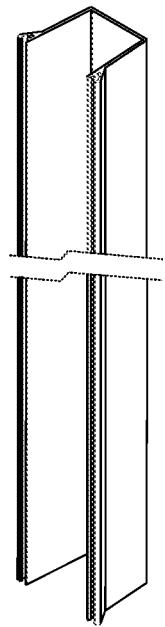
FIG. 6 provides a perspective view of the single cavity tower body utilized in the tower shown in FIG. 2.
Figure 7:
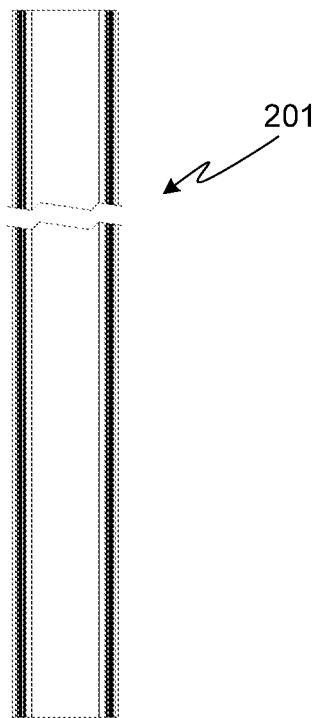
FIG. 7 provides a front view of the single cavity tower body utilized in the tower shown in FIG. 2.
Figure 8:
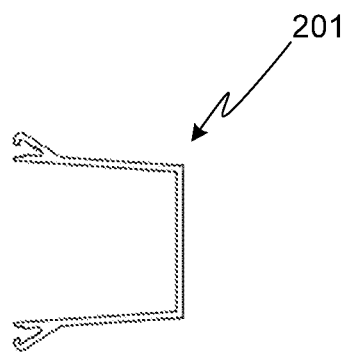
FIG. 8 provides a cross-sectional view of the single cavity tower body utilized in the tower shown in FIG. 2.
Figure 9:
FIG. 9 provides a perspective view of the face member utilized in the towers shown in FIGS. 1 and 2.
Figure 10:
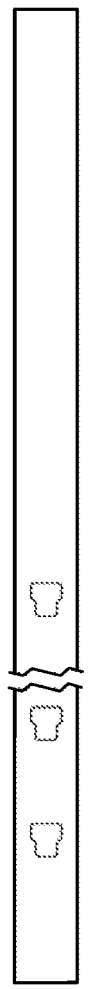
FIG. 10 provides a front view of the face member utilized in the towers shown in FIGS. 1 and 2.
Figure 11:
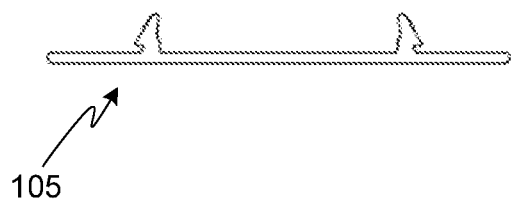
FIG. 11 provides a cross-sectional view of the face member utilized in the towers shown in FIGS. 1 and 2.

FIGS. 3-5 provide perspective, front and cross-sectional views of the dual cavity tower body 103 used in hydroponic tower 100. FIGS. 6-8 provide perspective, front and cross-sectional views of the single cavity tower body 201 used in hydroponic tower 200. FIGS. 9-11 provide perspective, front and cross-sectional views of tower face 105, suitable for use with either tower 100 (i.e., front and back faces) or tower 200 (i.e., front face only). Preferably both the body portion and the face are extruded, and features such as cut-outs 101 are punched during the process. Although any of a variety of materials can be used in the manufacture of the tower, preferably both components are fabricated from plastic (e.g., polyethylene, polypropylene, polyvinyl chloride, polytetrafluoroethylene, acrylonitrile butadiene styrene, etc.), and more preferably from an opaque polyvinyl chloride (PVC) plastic that is colored white. Using an opaque PVC material that prevents light from entering the tower helps to minimize algae blooms while the white coloring increases the amount of light reflected back onto the plants.

Separating the body portion (e.g., dual-sided body portion 103 or single-sided body portion 201) of the hydroponic tower from its face (e.g., face plate 105) adds flexibility that cannot be achieved when the tower body and face are fabricated as a single piece. Specifically, the same body portion can be used with a variety of different faces, thus allowing a grower to easily change between different plant containers, different cut-out designs, and different spacing between plants, all of which provide flexibility at minimal additional cost. Additionally, this same flexibility allows the grower to easily adapt to new types of plant containers as they become available without requiring that all tower components be replaced. Instead, in a typical situation the grower only needs to replace the front face in order to adapt to a new plant container design.

In a traditional hydroponic tower, the tower is extruded as a single piece. Due to the inclusion of the tower cavity, however, the extrusion process must operate at a relatively low rate in order to allow sufficient time for the heat contained within the tower cavity to be released. By separating the face from the tower body, the heat generated during the extrusion process is no longer trapped within the tower body, thereby allowing the extrusion process to operate much more quickly, thereby lowering manufacturing costs. Additionally, separating the tower into a body portion and a face portion allows features such as the plant container cut-outs 101 to be punched out during the extrusion process. This is in marked contrast, both in terms of time and cost, to the prior approach of utilizing a computer numerical control (CNC) machine to fabricate the cut-outs/features after the tower extrusion has been completed.

The multi-piece tower of the present invention can use either temporary or permanent fasteners to attach the tower face (e.g., face 105) to the tower body (e.g., body 103 and body 201). Permanent fasteners allow the manufacturing benefits associated with the multi-piece design to be achieved, specifically lower fabrication costs and better quality control per component, but forgo the advantages offered by having a removable front face. In those applications when a permanent fastener to couple the face to the tower body is desired, bonding (e.g., solvent bonding) is the preferred technique. Assuming the bond is continuous along the face-to-body joints, this approach distributes loads evenly over a large area while simultaneously eliminating water leaks between the face and the tower body. Other common techniques to permanently fasten the face to the tower body include ultra-sonic welding and non-removable snap fit fasteners.

Figure 12:
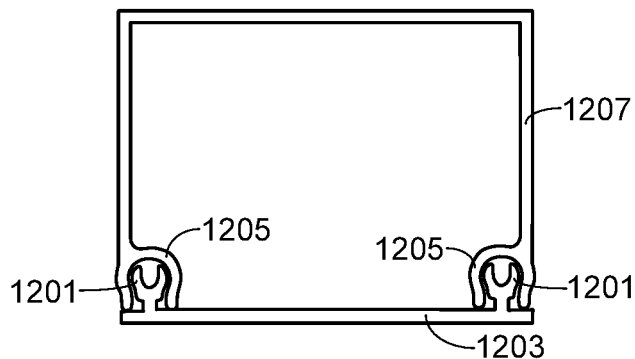
FIG. 12 illustrates a temporary snap fastener used to couple the tower face to the tower body.
Figure 13:
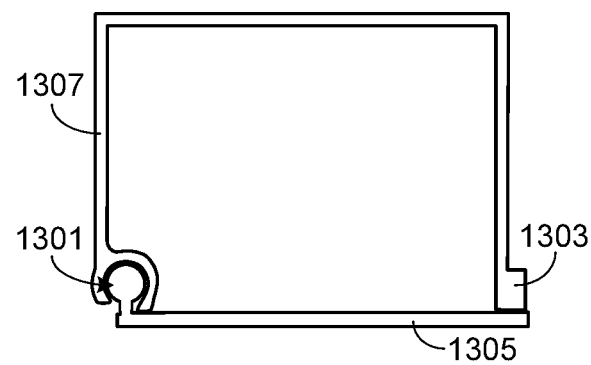
FIG. 13 illustrates a hinge configuration for coupling the tower face to the tower body.
Figure 14:
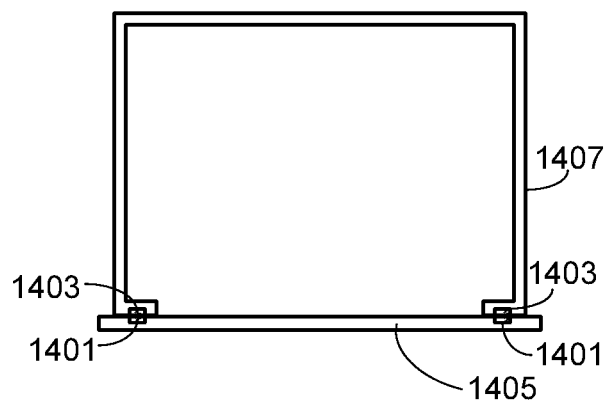
FIG. 14 illustrates the use of magnetic fasteners to couple the tower face to the tower body.

In order to achieve all of the benefits of the multi-piece tower design, preferably temporary fasteners are used to couple the tower face to the tower body. FIGS. 12-14 illustrate a few types of fasteners suitable for use with the invention, although it should be understood that these are just exemplary fasteners and that the invention is not limited to a particular type of fastener. FIG. 12 illustrates a snap fastener in which cylindrical members 1201 are fabricated onto tower face 1203 and complimentary members 1205, configured to accept cylindrical members 1201, are fabricated onto the tower body 1207. The exemplary embodiment shown in FIG. 13 uses a hinge joint 1301 and a latch fastener 1303 to couple the tower face 1305 to the tower body 1307. In this configuration, rather than completely removing the tower face, for example during tower cleaning, the tower face is simply unlatched and opened about hinge 1301. FIG. 14 uses magnets 1401 and 1403 to attach tower face 1405 to tower body 1407.

In addition to allowing either temporary or permanent fasteners to be used, it should be understood that the location of the fastener is not limited by the multi-piece design of the invention. For example, the fastener can be located within the tower body such as in the exemplary embodiment shown in FIG. 12, or outside the tower body such as in the exemplary embodiments shown in FIGS. 5 and 8, depending upon whether the design goal is to maximize open space within the tower body, or provide an external profile that permits close tower packing.

Figure 15:
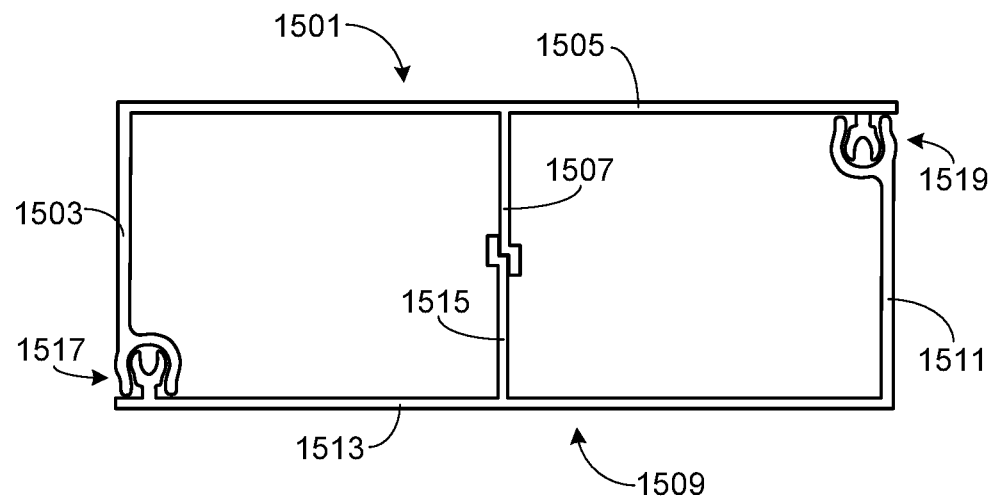
FIG. 15 provides a cross-sectional view of a two component, dual-sided tower configuration.

As noted above, the present invention is not limited to a specific type of fastener to couple the tower face to the tower body. Additionally, while the preferred embodiment utilizes separate face and tower body components, the invention is not limited to this joint location. For example, in a dual-sided tower configuration such as that shown in FIGS. 1 and 3-5, using separate face and tower components results in three individual components, i.e., the front face, the dual-sided body, and the rear face. FIG. 15 illustrates an alternative embodiment that achieves the same design goal, i.e., a dual-sided tower, but with only two components. This approach also reduces the number of fastener locations from four corners to two corners. As shown in FIG. 15, component 1501 includes a front face 1503, a double-sided side wall 1505, and a portion 1507 of the center wall that divides the two tower sides. Similarly, component 1509 includes a front face 1511, a double-sided side wall 1513, and a second portion 1515 of the center wall that divides the two tower sides. Components 1501 and 1509 are coupled together via fasteners 1517 and 1519. While snap fasteners are shown in the figure, it should be understood as previously noted that the invention is not limited to this type of fastener.

Figure 16:
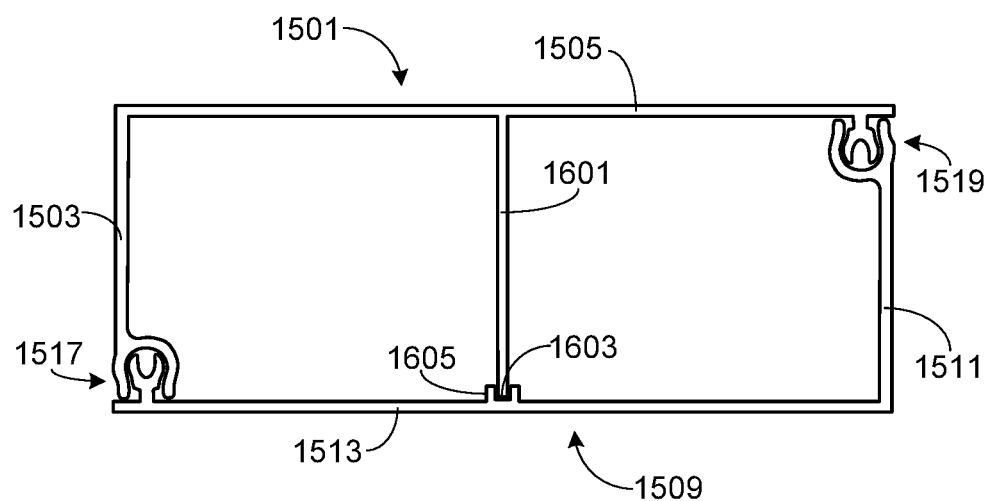
FIG. 16 provides a cross-sectional view of an alternate embodiment of a two component, dual-sided tower configuration.

In the embodiment shown in FIG. 15, portions 1507 and 1515 are shown to be of equal size. This configuration is not required by the invention. For example, as shown in FIG. 16 component 1501 may include the majority portion 1601 of the center dividing wall, where edge 1603 of wall portion 1601 mates with a receiver 1605 fabricated into side wall 1513 of component 1509. The benefit of an approach such as that shown in FIG. 15, however, is that in some configurations components 1501 and 1509 can be identical to one another, thereby allowing the same tooling to be used to fabricate both components. Note that in the two component, dual-sided configuration, it is not necessary for the junction between the center wall portions (e.g., portions 1507/1515 and portions 1601/1605) to form a leak-tight seal.

It will be appreciated that the physical requirements placed on the hydroponic tower depend on the exact nature of its intended use. Some of the use characteristics that impact design requirements include (i) desired tower height, (ii) number of plants per unit length, (iii) expected plant size at maturity and prior to harvesting, (iv) expected weight per plant and corresponding container, (v) intended means used to transfer plants/containers into and out of the tower, (vi) water/nutrient delivery system, etc. The towers disclosed herein are designed to hold a minimum distributed load of 25 pounds over 200 inches for a single-sided tower, and a minimum distributed load of 50 pounds over 200 inches for a dual-sided tower. The fasteners used to attach the tower components together are designed to withstand a 25 pound shear load over a 200 inch length parallel to the front face, and a 45 pound point force perpendicular to the front face.

In general, the cross-section of the tower cavities disclosed herein are selected to be in the range of 1.5 inches by 1.5 inches to 3 inches by 3 inches, where the term "tower cavity" refers to the region within the body of the tower and behind the tower face. Thus a dual-sided tower such as that shown in FIG. 1 has two back-to-back cavities, each preferably within this size range. It should be understood, however, that the invention is not limited to tower cavities with a square cross-section, nor is it limited to having a size selected from the size range noted above. Preferably wall thickness is within the range of 0.065 to 0.075 inches.

Figure 17:
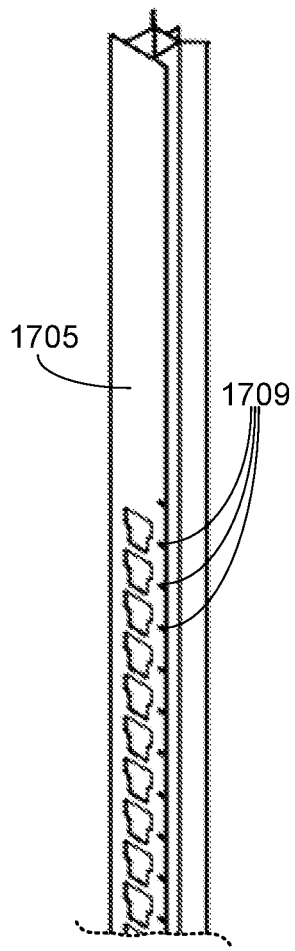
FIG. 17 provides a perspective view of an exemplary single-sided, multi-piece hydroponic tower that utilizes fins to increase tower stiffness.
Figure 18:
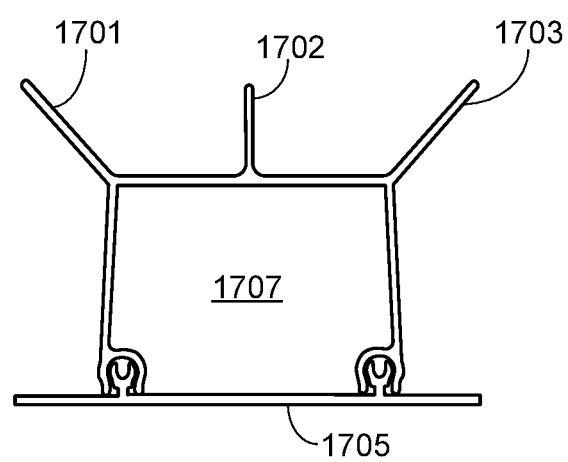
FIG. 18 provides a cross-sectional view of the hydroponic tower shown in FIG. 17.

The strength of the tower depends on the specific tower design which, in large part, depends on the intended crop, the means used to plant and harvest, the intended water/nutrient delivery system, the desired tower-to-tower packing density, etc. As a general guideline, however, the inventors have found that in addition to providing increased packing density and a lower overall tower cost (based on cost per plant), the dual-sided tower has the added benefit of dramatically increasing tower stiffness. To achieve the same stiffness in a single-sided tower without altering wall thickness or cavity size, fins can be added to the tower as illustrated in FIGS. 17 and 18. Note that in this embodiment, in addition to adding fins 1701-1703, the front face 1705 is wider than the width of the tower cavity 1707.

In at least one preferred embodiment, the side walls of the tower cavity are tapered. Tower cavity tapering is illustrated in the embodiments shown in FIGS. 1-8 and 18. In these embodiments, the cavity side walls are tapered inwards, from front to back, with a taper angle per wall of preferably less than 10 degrees, and more preferably less than 5 degrees. Tower cavity side wall tapering is helpful in those applications in which the plant containers that are intended to fit through cut-outs 101 are relatively wide and designed to span the entire distance, or close thereto, between the cavity side walls at or near the back cavity wall. By tapering the cavity side walls, and preferably by also tapering the side edges of the plant container, insertion of the container into the tower is simplified.

Towers 100 and 200 each utilize tower faces that are wider than the tower body. While this width difference is not required by the invention, it can provide several benefits. First, as previously noted, utilizing a wider tower face improves the tower strength relative to torsional loading about the tower's longitudinal axis. Second, the additional width can be used to mount tools to the tower, for example tools used during the insertion or removal of the plant containers, or tools used during harvesting. Third, the additional space next to the cut-outs simplifies the inclusion of indexing marks. The indexing marks, which may take the form of holes, indentations, dye marks, etc., provide a simple means of rapidly locating and identifying specific tower locations (e.g., cut-outs 103). Several of the figures show the indexing marks (see, for example, holes 1709 located on tower face 1705 shown in FIG. 17).

The hydroponic towers of the present invention are not limited to a specific water/nutrient delivery system. Thus, for example, a wicking system may be implemented within the disclosed towers. The preferred embodiment, however, directs the water/nutrient mix towards the tower's rear inner surface where it can then flow downward, feeding the plants contained in the individual plant containers that are fit into each tower cut-out (e.g., cut-out 101). In order to help control water/nutrient flow along the back wall of the tower cavity, preferably a series of vertical ridges are fabricated onto the wall. FIGS. 19-22 illustrate a dual-sided tower 1900 that incorporates this feature. It should be understood, however, that the ridge feature may be applied to any of the hydroponic tower configurations in which water/nutrient flow along the cavity wall is desired. In the illustrated embodiment, ridges 1901 are incorporated into both surfaces of cavity wall 1903, where wall 1903 divides the tower into first and second sides. In this embodiment, each ridge is 0.015 inches wide and extends from the wall surface by 0.015 inches. It will be appreciated that other ridge dimensions can be used, and that the ridges do not have to be uniform across the entire surface, i.e., the ridges in the center could be wider and/or deeper than those to either side of the wall center.

Systems and methods have been described in general terms as an aid to understanding details of the invention. In some instances, well-known structures, materials, and/or operations have not been specifically shown or described in detail to avoid obscuring aspects of the invention. In other instances, specific details have been given in order to provide a thorough understanding of the invention. One skilled in the relevant art will recognize that the invention may be embodied in other specific forms, for example to adapt to a particular system or apparatus or situation or material or component, without departing from the spirit or essential characteristics thereof. Therefore the disclosures and descriptions herein are intended to be illustrative, but not limiting, of the scope of the invention.

What is claimed is:

1. A dual-sided, multi-piece hydroponic tower, comprising:
    a tower body comprising:
        a pair of back-to-back vertical cavities, said pair of back-to-back vertical cavities comprising a common rear cavity wall, wherein a first side of said common rear cavity wall defines a rear first cavity wall that is integral to a first vertical cavity of said pair of back-to-back vertical cavities, and wherein a second side of said common rear cavity wall defines a rear second cavity wall that is integral to a second vertical cavity of said pair of back-to-back vertical cavities, and wherein said first side and said second side are opposing sides of said common rear cavity wall;
        a first tower body side wall, wherein a first portion of said first tower body side wall corresponds to said first vertical cavity, wherein a second portion of said first tower body side wall corresponds to said second vertical cavity, and wherein said common rear cavity wall divides said first tower body side wall between said first and second portions;
        a second tower body side wall, wherein a first portion of said second tower body side wall corresponds to said first vertical cavity, and wherein a second portion of said second tower body side wall corresponds to said second vertical cavity, and wherein said common rear cavity wall divides said second tower body side wall between said first and second portions;
    a first tower face coupleable to said first vertical cavity via said first portion of said first tower body side wall and said first portion of said second tower body side wall, said first tower face comprising a first plurality of plant container cut-outs, said first plurality of plant container cut-outs configured to accept a first plurality of plant containers;
    a second tower face coupleable to said second vertical cavity via said second portion of said first tower body side wall and said second portion of said second tower body side wall, said second tower face comprising a second plurality of plant container cut-outs, said second plurality of plant container cut-outs configured to accept a second plurality of plant containers;
    a first plurality of temporary fasteners configured to attach said first tower face to said tower body via said first portion of said first tower body side wall and said first portion of said second tower body side wall, said first vertical cavity configured to provide a first passageway for a water/nutrient mix; and
    a second plurality of temporary fasteners configured to attach said second tower face to said tower body via said second portion of said first tower body side wall and said second portion of said second tower body side wall, said second vertical cavity configured to provide a second passageway for said water/nutrient mix.

2. The dual-sided, multi-piece hydroponic tower of claim 1, wherein each temporary fastener of said first plurality of fasteners and said second plurality of fasteners is a snap fastener, wherein said first tower face is detachable from said tower body and said second tower face is detachable from said tower body.

3. The dual-sided, multi-piece hydroponic tower of claim 1, further comprising a first plurality of vertical ridges formed on and integral to said first side of said common rear cavity wall, and a second plurality of vertical ridges formed on and integral to said second side of said common rear cavity wall.

4. The dual-sided, multi-piece hydroponic tower of claim 3, said first plurality of vertical ridges of uniform width, and said second plurality of vertical ridges of uniform width.

5. The dual-sided, multi-piece hydroponic tower of claim 3, said first plurality of vertical ridges of non-uniform width, and said second plurality of vertical ridges of non-uniform width.

6. The dual-sided, multi-piece hydroponic tower of claim 1, said tower body and said first tower face and said second tower face each fabricated from a plastic material.

7. The dual-sided, multi-piece hydroponic tower of claim 6, said plastic material selected from the group consisting of polyethylene, polypropylene, polyvinyl chloride, polytetrafluoroethylene, and acrylonitrile butadiene styrene.

8. The dual-sided, multi-piece hydroponic tower of claim 6, wherein said plastic material is white.

\* \* \* \* \*